United States Patent [19]

Sato et al.

[11] 4,206,080

[45] Jun. 3, 1980

[54] METHOD OF PRODUCING OF TREATING MATERIAL FOR OIL-CONTAINING WASTE WATER

[75] Inventors: Hiroshi Sato, Hinoshima; Munetsugu Nakatani; Naoki Mochida, both of Otaki, all of Japan

[73] Assignee: Mitsubishi Rayon Company, Limited, Tokyo, Japan

[21] Appl. No.: 874,634

[22] Filed: Feb. 2, 1978

[30] Foreign Application Priority Data

Feb. 17, 1977 [JP] Japan .................................. 52-16462

[51] Int. Cl.$^2$ .............................................. B01D 15/00
[52] U.S. Cl. .................................... 252/430; 252/428, 252/429 R; 252/431 C; 210/36
[58] Field of Search ................... 252/428, 430, 429 R, 252/431 C; 210/36

[56] References Cited

U.S. PATENT DOCUMENTS

| | | | |
|---|---|---|---|
| 2,645,621 | 7/1953 | D'Alelio | 210/36 X |
| 3,247,140 | 4/1966 | Isaacs et al. | 252/430 X |
| 3,351,517 | 11/1967 | Willis | 252/430 X |
| 3,862,963 | 1/1975 | Hoshi et al. | 252/428 |
| 3,941,718 | 3/1976 | Barabas et al. | 252/428 X |
| 4,003,848 | 1/1977 | Cotter et al. | 252/430 X |
| 4,081,402 | 3/1978 | Levy et al. | 252/430 X |
| 4,082,660 | 4/1978 | Papirer | 210/36 |

*Primary Examiner*—Patrick Garvin
*Attorney, Agent, or Firm*—Oblon, Fisher, Spivak, McClelland & Maier

[57] ABSTRACT

An oil-adsorbing composition useful for removing oil from oil-contaminated water comprises a granulated mixture of 5-80 weight % of an inorganic filler capable of adsorbing oil and 95-20 weight % of a cross-linked polymer. The composition is melt-kneaded by mixing and crushing the ingredients while cross-linking the polymer.

17 Claims, 1 Drawing Figure

METHOD OF PRODUCING OF TREATING MATERIAL FOR OIL-CONTAINING WASTE WATER

BACKGROUND OF THE INVENTION

1. Field of the Invention

The present invention relates to an oil-absorbing material for treating oil-contaminated water which is useful for purifying such oil-contaminated waste streams as industrial waste water or municipal sewage and to a process for its preparation.

2. Description of the Prior Art

Methods of treating oil-contaminated waste water such as flotation, filtering, adsorption, and electrolysis have been suggested hitherto but are all very inefficient when the oil in the waste water is stabilized by being emulsified and dispersed.

Activated carbon and fibrous thermoplastic resins are already well known as waste water treating materials and activated carbon is extensively used for decolorizing and deodorizing water. Fibrous thermoplastic resins such as polyolefins are extensively used to treat waste water containing spilled oil or floating oil.

However, some waste water contains not only floating oil and suspended dispersed oil, but also emulsified dispersed oil. For example, when a high performance surface active agent is used to wash ships or machines, substantially all the oil content will become emulsified and dispersed in the waste water. Furthermore, as a result of the wide use of various surface active agents, even household waste water contains emulsified dispersed oil. The above mentioned activated carbon and fibrous thermoplastic resins shown substantially no oil collecting activity on waste water containing such emulsified dispersed oil and they are especially poor when the oil-contaminated waste water contains a nonionic surface active agent which emulsifies and disperses the oil.

Hence, a need has existed for an oil-adsorbing material capable of removing dispersed and emulsified oil contaminants from water.

SUMMARY OF THE INVENTION

An object of the present invention is to provide an oil-adsorbing material for treating oil-contaminated water which can substantially entirely remove not only floating oil and suspended dispersed oil, but also stably emulsified dispersed oil.

Another object of the invention is to provide a method of treating oil-contaminated waste water by using the oil-adsorbing material of the present invention.

Briefly, these objects and other objects of the present invention as hereinafter will become more readily apparent can be attained by an oil-adsorbing composition comprising a granulated mixture of 5–80 weight % of an inorganic filler material capable of adsorbing oil and 95–20 weight % of a cross-linked oleophilic polymer. The present oil-adsorbing composition is melt-kneaded by mixing and crushing the ingredients, while cross-linking the polymer.

BRIEF DESCRIPTION OF THE DRAWINGS

The single FIGURE is a photomicrograph, taken at a magnification of 90× with a scanning electron microscope, of the granular composition of this invention, prepared as in Example 12.

DESCRIPTION OF THE PREFERRED EMBODIMENTS

The inorganic filler, capable of adsorbing oil, which is used in the present invention is a substance capable of physically or chemically separating the oil present in waste water from the water. Such materials include oxides, hydroxides or salts of such metals as Na, Ca, Mg, Ba, Al, Fe, Ni, Zn, Pb or Mn, or clay minerals containing these materials.

Preferable adsorbing materials include magnesium oxide, magnesium hydroxide, magnesium silicate, magnesium phosphate, magnesium aluminate, magnesium aluminosilicate, calcium silicate, calcium sulfate, calcium sulfite, calcium nitrate, calcium hydroxide, barium sulfate, aluminum silicate, aluminum oxide, ferrous oxide, ferric oxide, ferric ferrous oxide, ferrous hydroxide, ferric hydroxide, ferrous chloride, ferric chloride, zinc oxide, zinc hydroxide, lead oxide, red lead, lead hydroxide, lead silicate, lead acetate or manganese dioxide. The clay minerals containing the above mentioned compounds include, for example, silica, kaolin clay, talc, dolomite, magnesite, mullite, pyroferrite, vermiculite, montmorillonite, asbestos, attapulgite, active clay, sericite, biotite or muscovite. Those substances can be used alone or in mixtures of two or more. Magnesium oxide and magnesium hydroxide are especially good oil adsorbents and are particularly preferred.

The cross-linked polymers which form one component of the composition of this invention are derived from polymers capable of being cross-linked by the action of heat or a cross-linking agent. The cross-linkable polymers are capable of forming a three-dimensional network structure when subjected to the action of heat or a cross-linking agent.

The cross-linkable polymers particularly adapted to the present invention are ethylenic polymers such a polyethylene, ethylene-vinyl acetate copolymers, ethylene-propylene copolymers, ethylene-propylenediene copolymers, ethylene-acrylic acid copolymer, ethylene-acrylate copolymers, ethylene-vinyl alcohol copolymers or chlorinated polyethylene or an unvulcanized natural rubber or synthetic rubber such as isoprene rubber, butadiene rubber, butadiene-styrene rubber, butadiene-acrylonitrile rubber, chloroprene rubber, butyl rubber, urethane rubber or acrylic rubber.

The composition of the present invention preferably contains 5–80 weight % of inorganic filler and 95–20 weight % of cross-linked polymer.

Hence, the precursor mixture which is subjected to the melt-kneading operation also preferably contains 5–80 weight % of inorganic oil-adsorbing filler and 95–20 weight % of cross-linkable polymer.

If the inorganic filler is less than 5 weight %, the adsorbing material will not have an effective adsorbing activity, particularly for emulsified dispersed oil. On the other hand, if the cross-linkable polymer is present in amounts less than 20 weight %, the melt-kneading operation will be so difficult that the adsorbent material produced will be unsatisfactory to use and handle.

The melt-kneading operation in preparing the composition of this invention is preferably carried out in the presence of a cross-linking agent which is effective to accelerate the cross-linking reaction of the polymer.

Such cross-linking agents are preferably organic peroxides such as ditertiary butyl peroxide, ditertiary amyl peroxide, tertiary butylcumyl peroxide, dicumyl peroxide, 2,5-dimethyl-2,5-di(tertiary butyl peroxy)hexane, 2,5-dimethyl-2,5-di(tertiary butyl peroxy)hexene-3,α,α'-bis-(tertiary butyl peroxy)diisopropylbenzene, 1,1-bis(-tertiary butyl peroxy)-3,3,5-trimethyl cyclohexane, normal butyl-4,4-bis(tertiary butyl peroxy)valerate, 2,2-bis(4,4-ditertiary butyl peroxy cyclohexyl)propane, 2,2-bis(tertiary butyl peroxy)butane, 1,1-di(tertiary butyl peroxy)cyclohexane, benzoyl peroxide, parachlorobenzoyl peroxide, 2,4-dichlorobenzoyl peroxide, tertiary butyl peroxybenzoate, ditertiary butyl diperoxyphthalate, and tertiary butyl peroxyisopropyl carbonate; sulfur or sulfur compounds such as tetramethylthiuram disulfide, tetraethylthiuram disulfide, tetrabutylthiuram tetrasulfide, morpholine disulfide and alkylphenol disulfide; or an oxime compound such as paraquinone dioxime, p,p'-dibenzoylquinone dioxime and tetrachloro-p-benzoquinone.

The amount of the cross-linking agent to be used is not critical, but, from the viewpoint of the cross-linking effect, 0.1–5 weight % may be used based on the cross-linkable polymer.

The apparatus to be used for carrying out the melt-kneading operation of the present invention is a device capable of granulating the mixture by shearing action, for example, a heated mixer or kneader such as a thermoplasticizing extruder, Banbury mixer or Farrel mixer. An extruder is preferably used because the oil-adsorbing material is thereby continuously produced.

The temperature and time for the melt-kneading operation are varied depending on the nature of the cross-linkable polymer and cross-linking agent, but are preferably 0.5–30 minutes at 50°–250° C.

By the melt-kneading operation, the inorganic filler and cross-linkable polymer are mixed; at the same time the cross-linkable polymer in the mixture is cross-linked by the heat or cross-linking agent; and in addition, the mixture containing the cross-linking polymer is subjected to a shearing action so as to be granulated.

As shown in the drawing, the oil-adsorbing material so obtained has the form of a fine coherent powder. The material has very many surface irregularities on the surface and has a surface structure evidently different from that of an ordinary crushed inorganic filler-polymer composition.

The adsorbent material of the present invention has a specific surface area of 0.1–50 $m^2/g$ determined by the nitrogen adsorption method, which is not greater than that of activated carbon. However, it is evidently superior to activated carbon or a fibrous thermoplastic resin in oil adsorption abilities and possesses a high adsorbing activity towards emulsified dispersed oil.

Further, by varying the melt-kneading conditions, the granule size of the oil-adsorbing material of the present invention can be controlled to encompass a range of about 1 cm to 50 mesh in response to the requirements of a particular waste water treating method and the character of the waste water to be treated.

The oil-adsorbing material of the present invention is different from conventional adsorbent materials and has the following advantages: It shows very favorable adsorbing performance not only for floating oil and suspended dispersed oil, but also for emulsified dispersed oil. It is easy to produce and continuous mass-production is possible. It is easy to incinerate. Its capacity is large. It is easy to load into a column or tank and easily removed.

In treating waste water by using the oil-adsorbing material of the present invention, a contact filtering method, a fixed bed adsorbing method, a moving bed adsorbing method or a fluid bed adsorbing method may be used. The fixed bed adsorbing method is preferably used, because it is simple and convenient.

It is also preferable to use existing treating equipment such as an activated carbon adsorbing column or sand filter along with the oil adsorbing treatment.

One method of using the oil-adsorbing material of the present invention is as follows: The adsorbent material of the present invention can be put into a column or tank in the same way as activated carbon. The waste water flow may be either upward or downward. Reverse washing can also be carried out in the same manner as with activated carbon. The used adsorbing material can be regenerated with an organic solvent or the like. However, since it can be incinerated, it is economically advantageous to incinerate the used oil-adsorbing material.

In treating waste water, it is possible to use the oil-adsorbent composition of this invention directly. However, it is preferable to first remove any oil or S—S content which can be easily removed by an agglomerating and precipitating method, pressure floatation method or a filtering method such as sand filtration, and then to treat the waste water with the oil-adsorbing material of the present invention.

Even when a completely water-soluble COD (chemical oxygen demand) load such as phenol or alcohol, which is difficult to remove with the oil-adsorbing material of the present invention, is present in water, if the oil content and S—S content in the water are first eliminated with the oil-adsorbing material of the present invention, and then the conventional adsorption treatment with activated carbon is carried out, the COD load can be completely removed and, at the same time, the life of the activated carbon will be greatly increased.

Having generally described the invention, a more complete understanding can be obtained by reference to certain specific examples, which are included for purposes of illustration only and are not intended to be limiting unless otherwise specified.

EXAMPLES 1–11

A number of mixtures were prepared, each comprising a cross-linkable polymer, an inorganic filler having oil-adsorbing activity and a cross-linking agent. The compositions are given in Table 1.

Each composition was melt-kneaded for a predetermined time using a Banbury mixer and thermoplasticizing single shaft extruder. When the extruder was used, the compositions were mixed in advance for 5 minutes by means of the Banbury mixer. The time of melt-kneading the compositions with the Banbury mixer and extruder was 0.5–30 minutes. By such melt-kneading, the compositions were mixed, while, at the same time, the polymer in the mixture was cross-linked and the mixture containing the cross-linked polymer was granulated by the shearing force involved in the kneading.

Each of the oil-adsorbing compositions so prepared was evaluated as follows:

A column 1 meter high was packed with the adsorbent material.

As oil-containing waste water, two kinds of model waste water were used: (A) a suspension of oil in water prepared by suspending and dispersing a turbine oil in water using a homogenizing mixer and adjusting the oil content to be 30 ppm and (B) an oil-in-water emulsion prepared by emulsifying and dispersing a turbine oil with a nonionic surface active agent in water using a homogenizing mixer and adjusting the oil content to be 30 ppm and the nonionic surface active agent to be 2 ppm. The model waste waters were passed through the column at a flow velocity of 5 m/hr. To evaluate the performance of the treating material, the oil-adsorbing capacity was measured by determining the breakthrough point, that is, the time until either (1) the oil content of the treated water, determined by extraction with n-hexane, reached 10% of the oil content in the model waste water or (2) the pressure drop in the packed column reached 1 kg/cm². The results of the treatment are shown in Table 1.

Control

When oil-containing waste water was treated in the same manner as in Examples 1–11 by using the following adsorbent materials, not only the emulsion model waste water (B) but also the suspension model waste water (A) reached the breakthrough point immediately after the treatment started and the oil adsorbing-capacity could not be determined.

Adsorbent I: Prepared by omitting the cross-linking agent in the composition of Example 1, melt-kneading the other ingredients, extruding the mixture in the form of a strand, and cutting and granulating the material at room temperature to prepare an adsorbent having uniform granule diameter.

Adsorbent II: Commercial polypropylene fiber.

Adsorbent III: Commercial granular activated carbon for treating water.

TABLE 1

| Example | Cross-linkable polymer | | Composition (by weight) | | | | Melt-kneading operation | | | Adsorbing capacity (g of adsorbed oil/g of treating material) | |
|---|---|---|---|---|---|---|---|---|---|---|---|
| | | | Inorganic filler | | Cross-linking agent | | device | temp. (°C.) | time (min.) | Suspended dispersed type (A) | Emulsified dispersed type (B) |
| 1 | EPDM[(1)] | 69 | Magnesium oxide | 30 | Dicumyl peroxide | 1 | Extruder | 220 | 1 | 0.20 | 0.38 |
| 2 | " | 67 | " | 30 | " | 3 | " | 180 | 3 | 0.23 | 0.45 |
| 3 | " | 48 | " | 50 | " | 2 | Banbury mixer | 160 | 10 | 0.18 | 0.35 |
| 4 | " | 20 | " | | " | 2 | Banbury mixer | 200 | 5 | 0.28 | 0.51 |
| 5 | " | 69 | Magnesium hydroxide | 30 | " | 1 | Banbury mixer | 160 | 10 | 0.20 | 0.37 |
| 6 | " | 47 | Magnesium hydroxide | 50 | " | 3 | Banbury mixer | 180 | 7 | 0.19 | 0.35 |
| 7 | " | 90 | Magnesium hydroxide | 8 | " | 2 | Extruder | 150 | 8 | 0.04 | 0.21 |
| 8 | EVA[(2)] | 68 | Magnesium oxide | 30 | " | 2 | Banbury mixer | 150 | 20 | 0.13 | 0.28 |
| 9 | Chloroprene | 60 | " | 35 | " | 5 | Banbury mixer | 150 | 13 | 0.15 | 0.30 |
| 10 | Natural rubber | 50 | " | 45 | Sulfur | 5 | Banbury mixer | 120 | 25 | 0.12 | 0.30 |
| 11 | EPDM | 68 | Ferric oxide | 30 | Dicumyl peroxide | 2 | Banbury mixer | 190 | 6 | 0.16 | 0.32 |

[(1)]EPDM: Ethylene-Propylene-Dienemonomer rubber (ethylene 74/propylene 24/dienemonomer 2 (wt))
[(2)]EVA: Ethylene-Vinylacetate copolymer (ethylene 66/vinylacetate 33 (wt))

EXAMPLES 12–23

Each of the compositions shown in Table 2 was mixed, melt-kneaded and extruded for 2 minutes at 170° C. using a thermoplasticizing bent type single shaft extruder of 50 mm in the diameter to obtain an adsorbent material having a granule diameter of 5–50 mesh. This adsorbent material was packed into a column and oil-containing waste water was treated with it.

An emulsified and dispersed oil-contaminated waste water prepared by emulsifying and dispersing 20 ppm of a turbine oil in water with a nonionic surface active agent by means of a homogenizing mixer and a suspension type oil-contaminated waste water prepared by suspending and dispersing 100 ppm of a turbine oil in water by means of a homogenizing mixer were used. The oil contents by the n-hexane extraction method were 13 and 80 ppm respectively. The height of the packed column was 1 meter. At the time of the treatment, the flow velocity was 8 m/hr and the packing density was 0.2–0.3 g/cc.

The oil-adsorbing capacity was determined in the same manner as in Examples 1–11 and is shown in Table 2.

TABLE 2

| Example | Cross-linkable polymer | | Composition (by weight) | | | | Waste water | Adsorbing capacity (g/g of treating material) |
|---|---|---|---|---|---|---|---|---|
| | | | Inorganic filler | | Cross-linking agent | | | |
| 12 | EVA | 66 | Magnesium oxide | 33 | Dicumyl peroxide | 1 | Emulsified disp. | 0.32 |
| 13 | " | 66 | " | 33 | " | 1 | Suspended disp. | 0.76 |
| 14 | " | 71 | Magnesium hydroxide | 28 | 2.5 dimethyl 2,5 di-(ter-butylperoxy)-hexane | 1 | Emulsified disp. | 0.65 |
| 15 | " | 71 | Magnesium hydroxide | 28 | 2.5 dimethyl 2,5 di-(ter-butylperoxy)-hexane | 1 | Suspended disp. | 0.21 |
| 16 | High density polyethylene | 71 | Magnesium oxide | 28 | 2.5 dimethyl 2,5 di-(ter-butylperoxy)- | | Emulsified disp. | 0.31 |

TABLE 2-continued

| Example | Cross-linkable polymer | Composition (by weight) | | | | Waste water | Adsorbing capacity (g/g of treating material) |
|---|---|---|---|---|---|---|---|
| | | Inorganic filler | | Cross-linking agent | | | |
| 17 | High density polyethylene | | 71 | " | 28 | 2.5 dimethyl 2,5 di-(ter-butylperoxy)-hexane 1 | Suspended disp. | 0.80 |
| 18 | EVA | Magnesium aluminate | 71 | 2.5 dimethyl 2,5 di-(ter-butylperoxy)-hexane | 28 | 1 Emulsified disp. | 0.23 |
| 19 | " | Magnesium aluminate | 71 | 2.5 dimethyl 2,5 di-(ter-butylperoxy)-hexane | 28 | 1 Suspended disp. | 0.76 |
| 20 | " | Silica | 71 | 2.5 dimethyl 2,5 di-(ter-butylperoxy)-hexane | 28 | 1 " | 0.59 |
| 21 | " | Magnesium aluminosilicate | 71 | 2.5 dimethyl 2,5 di-(ter-butylperoxy)-hexane | 28 | 1 " | 0.70 |
| 22 | " | Rouge(Ferric oxide) | 71 | 2.5 dimethyl 2,5 di-(ter-butylperoxy)-hexane | 28 | 1 " | 0.85 |
| 23 | " | Barium sulfate | 62 | 2.5 dimethyl 2,5 di-(ter-butylperoxy)-hexane | 37 | 1 " | 0.87 |

EXAMPLE 24

A composition comprising an ethylene-vinyl acetate copolymer (ethylene/vinyl acetate, 75/25 (wt)), magnesium oxide and dicumyl peroxide having the proportions (by weight) of 49.8:49.8:0.4 was melt-kneaded in the same manner as in Example 2 to obtain an adsorbent material.

The model waste water used in each of Examples 1–11 was treated with this treating material by the contact adsorbing method, wherein the oil content was adsorbed by dispersing and agitating the adsorbent material in the waste water. The amount of the adsorbent material added to the waste water was 1 weight %. The agitator speed was 150 rpm. After treatment for 30 minutes, the oil contents by the n-hexane extraction method in types (A) and (B) model waste water were both 0.

EXAMPLE 25

When waste water from steel rolling operations, having an oil content of 10 ppm by the n-hexane extraction method and a COD value of 40 ppm by the manganese method was passed at a flow velocity of 10 m/hr through a column packed to a height of 1 m with the adsorbent material of Example 12 and then was passed through an activated carbon adsorbing column, the oil content by the n-hexane extraction method of the treated water was 1 ppm and the COD value was less than 10 ppm.

EXAMPLE 26

When waste water from car washing having an oil content of 22 ppm and an S—S content of 250 ppm by the n-hexane extraction method was passed through a sand filtering column and was then passed at a flow velocity of 8 m/hr through a column packed to a height of 30 cm with the treating material obtained in each of Examples 20 and 23, with either treating material, the treated water had an oil content and S—S content both less than 1 ppm.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing an oil-adsorbing composition for purifying suspended dispersed oil and emulsified dispersed oil-containing water which comprises melt-kneading a mixture comprising 5–80 wt.% of an inorganic filler capable of adsorbing oil and 95–20 wt.% of at least one cross-linkable polymer selected from the group consisting of ethylenic polymer and rubber and a cross-linking agent at a temperature of 50°–250° C. for 0.5–30 minutes using a melt-kneading device, whereby said mixture is mixed, said cross-linkable polymer is cross-linked, and said composition is granulated in the form of a fine coherent powder at said temperature of 50°–250° C.

2. The process according to claim 1, wherein said inorganic filler comprises at least one member selected from the group consisting of magnesium hydroxide, magnesium silicate, magnesium phosphate, magnesium aluminate, magnesium oxide, magnesium aluminosilicate, calcium sulfite, calcium oxide, ferrous oxide, ferric oxide, ferric ferrous oxide, ferrous hydroxide, ferric hydroxide, ferrous chloride, ferric chloride, zinc oxide, zinc hydroxide, lead oxide, red lead, lead hydroxide, lead silicate, lead acetate, barium sulfate and manganese dioxide.

3. The process according to claim 1, wherein said inorganic filler comprises at least one member selected from the group consisting of silica, kaolin clay, talc, dolomite, magnesite, mullite, pyroferrite, vermiculite, montmorillonite, asbestos, attapulgite, active clay, sericite, biotite and muscovite.

4. The process according to claim 1, wherein said ethylenic polymer comprises at least one member selected from the group consisting of a polyethylene, ethylene-vinyl acetate copolymers, ethylene-propylene copolymers, ethylene-propylene-diene copolymers, ethylene-acrylic acid copolymers, ethylene-acrylate copolymers, ethylene-vinyl alcohol copolymers and chlorinated polyethylene.

5. The process according to claim 1, wherein said rubber comprises at least one member selected from the group consisting of natural rubber and synthetic rubber.

6. The process according to claim 5, wherein said synthetic rubber is selected from the group consisting of polyisoprene, polybutadiene, butadiene-styrene copolymers, butadiene-acrylonitrile copolymers, polychloroprene, butyl rubber, urethane rubber and acrylic rubber.

7. The process according to claim 1, wherein said cross-linking agent comprises at least one member selected from the group consisting of organic peroxides, sulfur, sulfur compounds, and oxime compounds.

8. The process according to claim 1, wherein said melt-kneading is carried out using a thermoplasticizing extruder.

9. The process according to claim 1, wherein said melt-kneading is carried out using a Banbury mixer.

10. The process according to claim 1, wherein said melt-kneading is carried out using a Farrel mixer.

11. An oil-adsorbing composition for purifying suspended dispersed oil and emulsified dispersed oil-containing water, prepared by melt kneading a mixture comprising 5–80 wt.% of an inorganic filler capable of adsorbing oil and 95–20 wt.% of at least one cross-linkable polymer selected from the group consisting of ethylenic polymer and rubber and a cross-linking agent at a temperature of 50°–250° C. for 0.5–30 minutes using a melt-kneading device, whereby said composition is mixed, said polymer is cross-linked, and said composition is granulated in the form of a fine coherent powder at said temperature of 50°–250° C.

12. An oil-adsorbing composition according to claim 11, wherein said inorganic filler comprises at least one member selected from the group consisting of magnesium hydroxide, magnesium oxide, magnesium silicate, magnesium phosphate, magnesium aluminate, magnesium aluminosilicate, calcium sulfite, calcium oxide, ferrous oxide, ferric oxide, ferric ferrous oxide, ferrous hydroxide, ferric hydroxide, ferrous chloride, ferric chloride, zinc oxide, zinc hydroxide, lead oxide, red lead, lead hydroxide, lead silicate, lead acetate, barium sulfate and manganese dioxide.

13. The oil-adsorbing composition according to claim 11, wherein said inorganic filler comprises at least one member selected from the group consisting of silica, kaolin clay, talc, dolomite, magnesite, mullite, pyroferrite, vermiculite, montmorillonite, asbestos, attapulgite, active clay, sericite, biotite and muscovite.

14. The oil-adsorbing composition according to claim 11, wherein said ethylenic polymer comprises at least one member selected from the group consisting of a polyethylene, ethylene-vinyl acetate copolymers, ethylene-propylene copolymers, ethylene-propylene-diene copolymers, ethylene-acrylic acid copolymers, ethylene-acrylate copolymers, ethylene-vinyl alcohol copolymer and chlorinated polyethylene.

15. The oil-adsorbing composition according to claim 11, wherein said rubber comprises at least one member selected from the group consisting of natural rubber and synthetic rubber.

16. The oil-adsorbing composition according to claim 15, wherein said synthetic rubber is selected from the group consisting of a polyisoprene, polybutadiene, butadiene-styrene copolymers, butadiene-acrylonitrile copolymers, polychloroprene, butyl rubber, urethane rubber and acrylic rubber.

17. The oil-adsorbing composition according to claim 11, wherein saic cross-linking agent comprises at least one member selected from the group consisting of organic peroxides, sulfur, sulfur compounds and oxime compounds.

* * * * *